US011824792B2

(12) United States Patent
Dauwe et al.

(10) Patent No.: US 11,824,792 B2
(45) Date of Patent: Nov. 21, 2023

(54) METHOD AND SYSTEM FOR DYNAMIC QUOTA-BASED CONGESTION MANAGEMENT

(71) Applicant: Hewlett Packard Enterprise Development LP, Houston, TX (US)

(72) Inventors: Daniel William Dauwe, Fort Collins, CO (US); Ryan Dean Menhusen, Fort Collins, CO (US); Darel Neal Emmot, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/410,422

(22) Filed: Aug. 24, 2021

(65) Prior Publication Data
US 2023/0061885 A1    Mar. 2, 2023

(51) Int. Cl.
| | | |
|---|---|---|
| *H04L 47/22* | (2022.01) | |
| *H04L 47/722* | (2022.01) | |
| *H04L 47/12* | (2022.01) | |
| *H04L 43/0852* | (2022.01) | |
| *H04L 43/50* | (2022.01) | |
| *H04L 43/0823* | (2022.01) | |

(52) U.S. Cl.
CPC ........ *H04L 47/722* (2013.01); *H04L 43/0823* (2013.01); *H04L 43/0852* (2013.01); *H04L 43/50* (2013.01); *H04L 47/12* (2013.01)

(58) Field of Classification Search
CPC ............... H04L 47/722; H04L 43/0823; H04L 43/0852; H04L 43/50; H04L 47/12
See application file for complete search history.

(56) References Cited

U.S. PATENT DOCUMENTS

| | | | |
|---|---|---|---|
| 10,063,481 B1* | 8/2018 | Jiang ..................... | H04L 5/0044 |
| 11,032,205 B2* | 6/2021 | Shen ....................... | H04L 47/41 |
| 2018/0083878 A1* | 3/2018 | Francini .................. | H04L 47/33 |
| 2019/0059023 A1* | 2/2019 | Forsman ................. | H04L 47/30 |
| 2019/0222520 A1* | 7/2019 | Kandasamy .......... | H04L 47/283 |
| 2019/0297018 A1* | 9/2019 | Dearth ................ | H04L 43/0888 |
| 2020/0280518 A1* | 9/2020 | Lee ....................... | H04L 47/115 |

* cited by examiner

*Primary Examiner* — Donald L Mills
(74) *Attorney, Agent, or Firm* — Sheppard Mullin Richter & Hampton LLP (57) ABSTRACT

A system for facilitating sender-side congestion control is provided. During operation, the system, on a sender node, can determine the utilization of a buffer at a last-hop switch to a receiver node based on in-flight packets to the receiver node. The receiver node can be reachable from the sender node via the last-hop switch. The system can then determining a fraction of available space in the buffer for packets from the sender node based on the utilization of the buffer. Subsequently, the system can determine whether the fraction of the available space in the buffer can accommodate a next packet from the sender node while avoiding congestion at the buffer at the receiver node. If the fraction of the available space in the buffer can accommodate the next packet, the system can allow the sender node to send the next packet to the receiver node.

20 Claims, 9 Drawing Sheets

METHOD AND SYSTEM FOR DYNAMIC QUOTA-BASED CONGESTION MANAGEMENT

BACKGROUND

Field

The present disclosure relates to communication networks. More specifically, the present disclosure relates to a method and system for dynamic quota-based congestion management.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

Internet is the delivery medium for a variety of applications running on physical and virtual devices. Such applications have brought with them an increasing demand for bandwidth. As a result, equipment vendors race to build larger devices with significant processing capabilities. However, the processing capability of a device may not be sufficient to keep up with complex systems that run on such devices. For example, software systems may require a significant number of processing cycles and increasing amounts of memory bus bandwidth. Even with significant processing capability, these devices may not provide the desired level of performance for complex systems.

A flexible and efficient way to meet the requirements of complex systems can be based on memory-semantic communications. Memory-semantic communication facilitates data exchange between memory modules located on different devices (or components) with low latency. Unifying the communication paths by using memory-semantic communication may eliminate bottlenecks and improve efficiency and performance. To provide data to the processor as quickly and as efficiently as possible, the memory bus is designed as a high-bandwidth, low-latency interface based on simple instructions. As a result, systems run well when run in memory.

Therefore, memory-semantic communication can enhance the computing capabilities of the devices by reducing overhead. Gen-Z is a memory-semantic fabric that can be used to communicate to the devices in a computing environment. By unifying the communication paths and simplifying software through simple memory semantics, Gen-Z switches can facilitate high-performance solutions for complex systems. While memory-semantic communication can bring many desirable features to a computing environment, some issues remain unsolved regarding VC management and remapping in a switch.

One aspect of the present technology can provide a system for facilitating sender-side congestion control. During operation, the system, on a sender node, can determine the utilization of a buffer at a last-hop switch of a receiver node based on in-flight packets to the receiver node. The receiver node is reachable from the sender node via the last-hop switch. The system can then determine a fraction of available space in the buffer for packets from the sender node based on the utilization of the buffer. Subsequently, the system can determine whether the fraction of the available space in the buffer can accommodate a next packet from the sender node while avoiding congestion at the receiver node. If the fraction of the available space in the buffer can accommodate the next packet, the system can allow the sender node to send the next packet to the receiver node.

In a variation on this aspect, the system can determine a number of sender nodes sending packets to the receiver node based on the calculated utilization of the buffer and the in-flight packets from the sender node to the receiver node.

In a further variation, the system can determine the fraction of the available space further based on the number of sender nodes.

In a further variation, the system can update the number of sender nodes based on a response rate from the receiver node.

In a variation on this aspect, the system can determine whether the next packet can be sent to the receiver node by determining whether available space at the buffer can accommodate the next packet.

In a variation on this aspect, the system can determine whether the next packet can be sent to the receiver node by determining a request rate from the sender node to the receiver node based on a combination of previous packets to the receiver node and the next packet. The system can then determine whether the request rate is within a response rate from the receiver node.

In a variation on this aspect, the system can determine the utilization of the buffer by determining a steady-state utilization of the buffer based on a queuing delay between the sender and receiver nodes.

In a variation on this aspect, if sending the next packet can cause congestion at the buffer, the system can buffer the next packet at the sender node, thereby avoiding triggering congestion control at the sender node.

In a variation on this aspect, the system can determine the utilization of the buffer by monitoring a set of triggering events at the sender node. Upon detecting at least one triggering event, the system can determine information associated with the utilization of the buffer.

In a further variation, the set of triggering events comprises one or more of: initiating a transaction request by an application on the sender node, injecting a packet by the sender node, receiving a response from the receiver node, and detecting a packet drop.

The examples described herein solve the problem of efficiently managing diverse congestion scenarios by (i) determining the fraction of buffer space at a last-hop switch (e.g., to a responding node) available to an individual requesting (or sender) node, and (ii) forwarding a new packet based on the available buffer space and a response rate of the responding (or receiver) node. The buffer at the last-hop switch can be an egress buffer via which the responding node is reachable. The requesting node can send a new packet comprising a request if the packet can be accommodated in the fraction of available buffer space and the responding node responds at least at the sending rate. In this way, the requesting node can ensure the new packet can be buffered without overwhelming the last-hop switch's egress buffer, thereby efficiently avoiding congestion.

Typically, a device can use a congestion management mechanism to determine whether to inject a new packet such that the injection does not interfere with other traffic flows to a responding node (or receiver). With existing technologies, the responding node or the last-hop switch may initiate an explicit congestion notification (ECN) directed to a respective requesting node upon detecting congestion. An ECN response can be sent when the buffer utilization (or occupation) at the responding node or a switch reaches a threshold. However, the ECN response is typically a "binary" response that can indicate whether congestion has occurred or not. Based on the ECN response, the requesting node may throttle its traffic based on a predefined range of throttling levels. Such a notification and throttling mechanism may limit how well the requesting nodes can respond to diverse congestion scenarios. Consequently, the existing ECN mechanism may over or under throttle traffic when multiple data flows cause multiple congestion scenarios. Since the diversity of possible congestion events and the probability of their occurrence increase as the size of a network increases, the existing ECN mechanism may become inefficient.

Furthermore, only a subset of all traffic arriving at a responding node may contribute to the congestion. Such traffic can be referred to as contributing traffic. Due to lack of specificity, ECN-based congestion management may incorrectly throttle non-contributing traffic in addition to the contributing traffic. When the network scales up, the number of applications generating non-contributing traffic may also increase. Consequently, a small fraction of the large workload may incorrectly trigger throttling for the entire workload based on the ECN-based congestion control mechanism. As a result, traffic may unnecessarily accumulate at requesting nodes and cause spikes of released packets. Such a response leads to inconsistency in the network, thereby increasing the execution time of non-contributing traffic. Since buffer sizes remain persistent even though the number of potential participants may increase, the probability of reaching the threshold and triggering ECN-based incorrect traffic throttling can be high.

To solve this problem, a respective requesting node may facilitate a quota-based congestion management system that can efficiently forward packets to a responding node while avoiding the buffer reaching the threshold. In this way, the requesting node can leave the non-contributing traffic unaffected and perform with high accuracy. A packet can include a request for a new or an ongoing transaction. The requesting node can determine the average utilization of a buffer at a last-hop switch of a responding node in equilibrium and determine the fraction of buffer space available for the packets from the requesting node. The switch can be the last switch capable of recognizing the request on a path from the requesting node to the responding node. In other words, the responding node can be reachable from the requesting node via the switch. For example, the switch can be the last Gen-Z component on the path that can recognize a request in a packet. The responding node can be coupled to the switch.

In some embodiments, the buffer can reside in the forwarding hardware of the switch via which the responding node is reachable. The buffer can be deployed on a dedicated piece of memory device for the buffer (e.g., a dedicated piece of random-access memory (RAM)) or a shared memory device for all egress buffers on the switch. The requesting node can send a new packet to the responding node if the fraction of available buffer space can accommodate that packet. The requesting node can also ensure that the rate of the request packets from the requesting node matches the rate of received responses, thereby ensuring that the requesting node can quickly respond to changes in the network. In this way, the requesting node may throttle its traffic injection without requiring the ECN-based response from the responding node, thereby avoiding the adverse effects of ECN.

During operation, the requesting node can determine information indicating the expected performance of network components and the system-level parameters affecting queuing (e.g., link latencies and downstream buffer sizes). Such information can be associated with the devices and network, and may remain persistent. The requesting node can also maintain information associated with in-flight packets and received response packets. For example, the requesting node may maintain such information in a data structure or a database table. The requesting node may use the information to determine the utilization of the egress buffer at the switch via which the corresponding responding node is reachable. Since the switch may receive packets destined to the responding node from multiple upstream switches, the buffer at the switch may accumulate packets at a faster rate than the egress rate to the responding node. Consequently, determining the utilization of the buffer can provide an indication of whether responding node may become overwhelmed.

The requesting node may monitor one or more triggering events when the requesting node may determine the utilization of the buffer on the egress path to the responding node. The triggering events can include one or more of: initiating a transaction request (e.g., initiation of a packet stream), injecting a packet into the network, receiving a response from the responding node (e.g., for an ongoing transaction), and detecting a packet drop (e.g., based on the expiration of a packet retransmission timer). Upon detecting a triggering event, the requesting node can update its determination of the buffer utilization based on the detected event. The requesting node can also determine the number of nodes sending traffic. These nodes can be referred to as participants. Based on the buffer utilization and the number of participants, the requesting node can determine the fraction of buffer space available for packets from the requesting node. When the requesting node needs to send a new packet (e.g., an application attempts to inject the new packet), the requesting node can determine whether the determined buffer space can accommodate the packet.

If the requesting node estimates that a new packet of a transaction may overwhelm the responding node, the requesting node may initiate throttling traffic and refrain from injecting the packet into the network. Such throttling can be proportional to the number of participants. For example, if the requesting node is sending all of its egress traffic to the congested responding node, the requesting node can determine a high queuing delay and hence, may determine a large number of participants. Consequently, the requesting node can incur high level of traffic throttling according to the amount of traffic sent to the responding node. On the other hand, when the egress traffic from the requesting node is distributed (e.g., uniformly distributed among a plurality of responding node), the queuing delay determined by the requesting node can be relatively lower. As a result, the requesting node may have lower traffic throttling compared to the previous scenario.

When a response, which may belong to a different transaction, is received from the responder, the requesting node may re-determine the fraction of available buffer space associated with the requesting node. Since a response may free buffer space for sending the next packet, the re-determination may indicate the availability of adequate space at the buffer on the egress path to the responding node. In addition, if the rate of the responses from the responding node matches the rate of request packets, the requesting node may send the withheld packet to the responding node. In this way, the congestion management system can throttle traffic. Unlike an ECN-based response from the responding node, where traffic to all responding nodes are throttled equally, the quota-based congestion management system can throttle traffic proportional to the amount of data sent to the congested responding node, thereby facilitating efficient congestion management.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

The term "requesting node" refers to a device that initiates a request (e.g., associated with a transaction) directed to another device. "Requesting node" can be replaced by other terminologies referring to a request initiating device, such as "requester," "initiator," "source," and "sender." Furthermore, the term "responding node" can refer to a device that responds to the request. "Responding node" can be replaced by other terminologies referring to a request responding device, such as "responder," "destination," and "receiver." A phrase indicating a device, such as "node," "machine," "entity," or "device" may follow the aforementioned replacement phrases.

Figure 1:
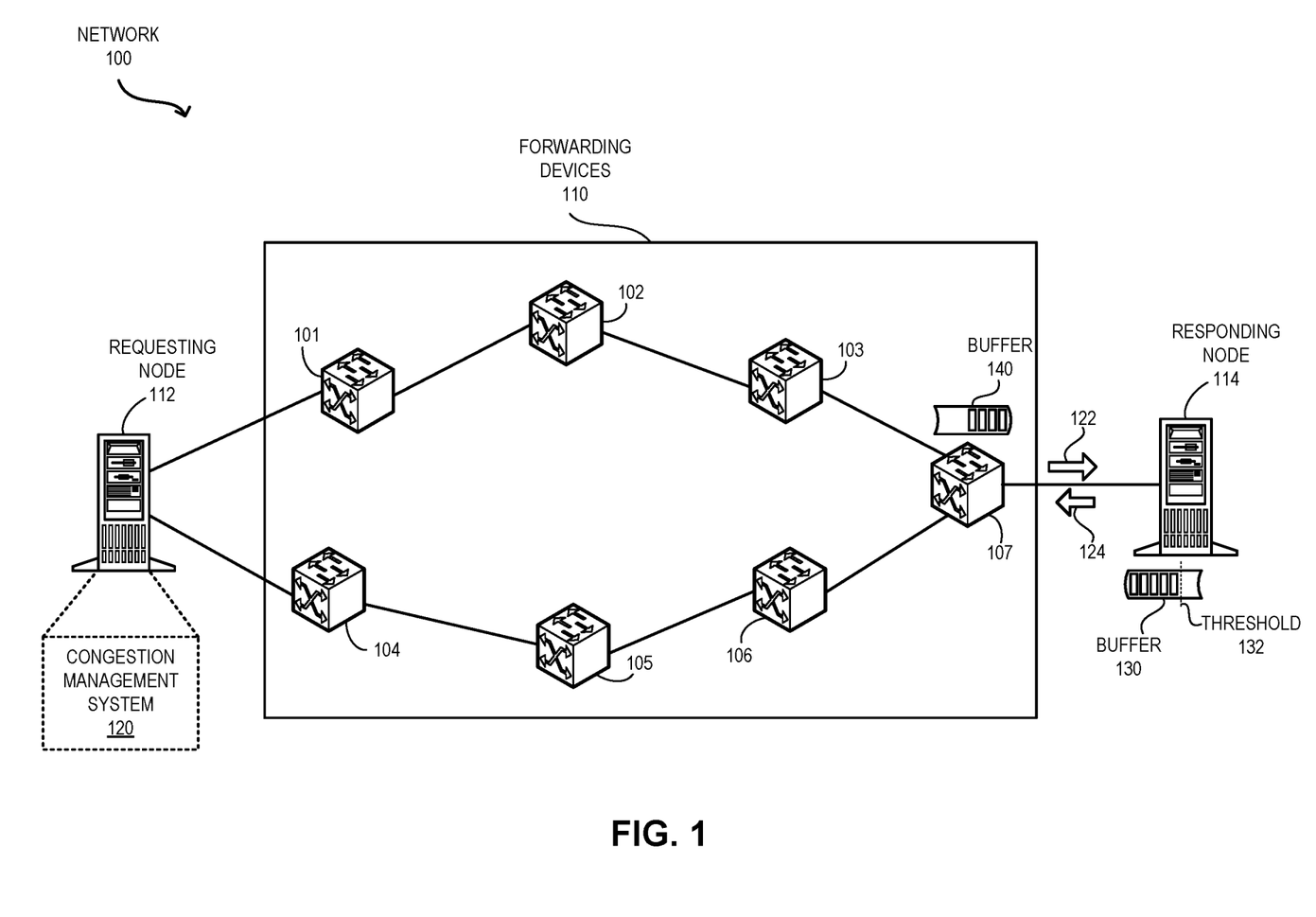
FIG. 1 illustrates an exemplary network supporting dynamic quota-based congestion management, in accordance with an aspect of the present application.

FIG. 1 illustrates an exemplary network supporting dynamic quota-based congestion management, in accordance with an aspect of the present application. A network 100 may comprise a number of forwarding devices 110, which can include switches 101, 102, 103, 104, 105, 106, and 107. Network 100 can also include end node (or end device) 112 coupled to switches 101 and 104, and end node 114 coupled to switch 107. Switch 107 can be the last switch capable of recognizing a request on a path from requesting node 112 to responding node 114. In some examples, network 100 is a Gen-Z network, and a respective switch of network 100 is a Gen-Z component. Under such a scenario, communication among the switches in network 100 is based on memory-semantic communications. A respective packet forwarded via network 100 may be referred to as a transaction, and the corresponding data unit can be a flit. Switch 107 can be the last Gen-Z component on a path from requesting node 112 to responding node 114. In some other examples, network 100 can be an Ethernet, InfiniBand, or other networks, and may use a corresponding communication protocol, such as Internet Protocol (IP), FibreChannel over Ethernet (FCoE), or other protocol.

Typically, nodes 112 and 114 can use a congestion management mechanism to determine whether to inject a new packet into network 100 such that the injection does not interfere with other traffic flows to responding node 114. Responding (or receiver) node 114 can include a buffer 130 for storing requests issued from a respective requesting (or sender) node, such as node 112. Buffer 130 can be an individual buffer or a combination of buffers that can hold requests from a requesting node. Accordingly, responding node 114 can store a request 122 from requesting node 112 in buffer 130. Responding node 114 may process the requests from buffer 130 based on a pre-determined order (e.g., first-in, first-out, priority-based, or class-based order). With existing technologies, upon detecting congestion, responding node 114 may initiate ECN directed to requesting node 112. Sending node 114 can send an ECN response 124 when the utilization (or occupation) of buffer 130 reaches a threshold 132.

However, ECN response 124 can be typically a "binary" response indicating whether congestion has occurred or not at responding node 114 or switch 107. Based on ECN response 124, requesting node 112 may throttle its traffic based on a predefined range of throttling levels. Such a notification and throttling mechanism may limit how well requesting node 112 can respond to diverse congestion scenarios. Consequently, the existing ECN mechanism may over or under throttle traffic from requesting node 112 when multiple data flows cause multiple congestion scenarios. Since the diversity of possible congestion events and the probability of their occurrence increase as the size of network 100 increases, the existing ECN mechanism may become inefficient.

Furthermore, responding node 114 may receive traffic from a plurality of remote nodes in network 100. However, only the traffic from requesting node 112 may contribute to the congestion. Due to the binary indication of congestion, an ECN response message may incorrectly throttle non-contributing traffic in addition to the contributing traffic from requesting node 112. If network 100 scales up, such incorrect throttling may adversely affect a significant volume of traffic. Consequently, traffic may unnecessarily accumulate at requesting nodes and cause spikes of released packets in network 100. Such a response leads to inconsistency in network 100, thereby increasing the execution time of non-contributing traffic. Since the size of buffer 130 may remain persistent even if the number of requesting nodes can increase, the probability of reaching threshold 132 and triggering incorrect traffic throttling based on an ECN response can be high.

To solve this problem, requesting node 112 may facilitate a quota-based congestion management system 120 that can facilitate efficient packet forwarding while avoiding buffer 130 reaching threshold 132. In some embodiments, congestion management system 120 can operate on a NIC of requesting node 112. In other words, the NIC of requesting node 112 can facilitate the quota-based congestion management. Requesting node 114 can leave the non-contributing traffic unaffected and perform with high accuracy. Requesting node 112 can determine the average utilization of a buffer 140 in the last-hop switch 107 to requesting node 114 in equilibrium and determine the fraction of buffer 140 available for the packets from requesting node 112. Since switch 107 may receive packets destined to responding node 114 from switches 103 and 106, buffer 140 may accumulate packets at a faster rate than the egress rate to responding node 114. Consequently, determining the utilization of buffer 140 can provide an indication of whether packets from buffer 140 may overwhelm responding node 114 (e.g., overwhelm buffer 130).

Requesting node 112 can then send a new packet to responding node 114 if the fraction of available space in buffer 140 can accommodate that packet. Requesting node 112 can also ensure that the rate of the request packets sent from requesting node 112 matches the rate of received responses, thereby ensuring that requesting node 112 can quickly respond to changes in network 100. In this way, requesting node 112 may throttle its traffic injection without requiring the ECN-based response from requesting node 114, thereby avoiding the adverse effects of ECN in network 100. Buffer 140 can be on the forwarding hardware of switch 107. For example, buffer 140 can be implemented using a memory device (e.g., dedicated for buffer 140 or shared among other buffers of switch 107).

Figure 2:
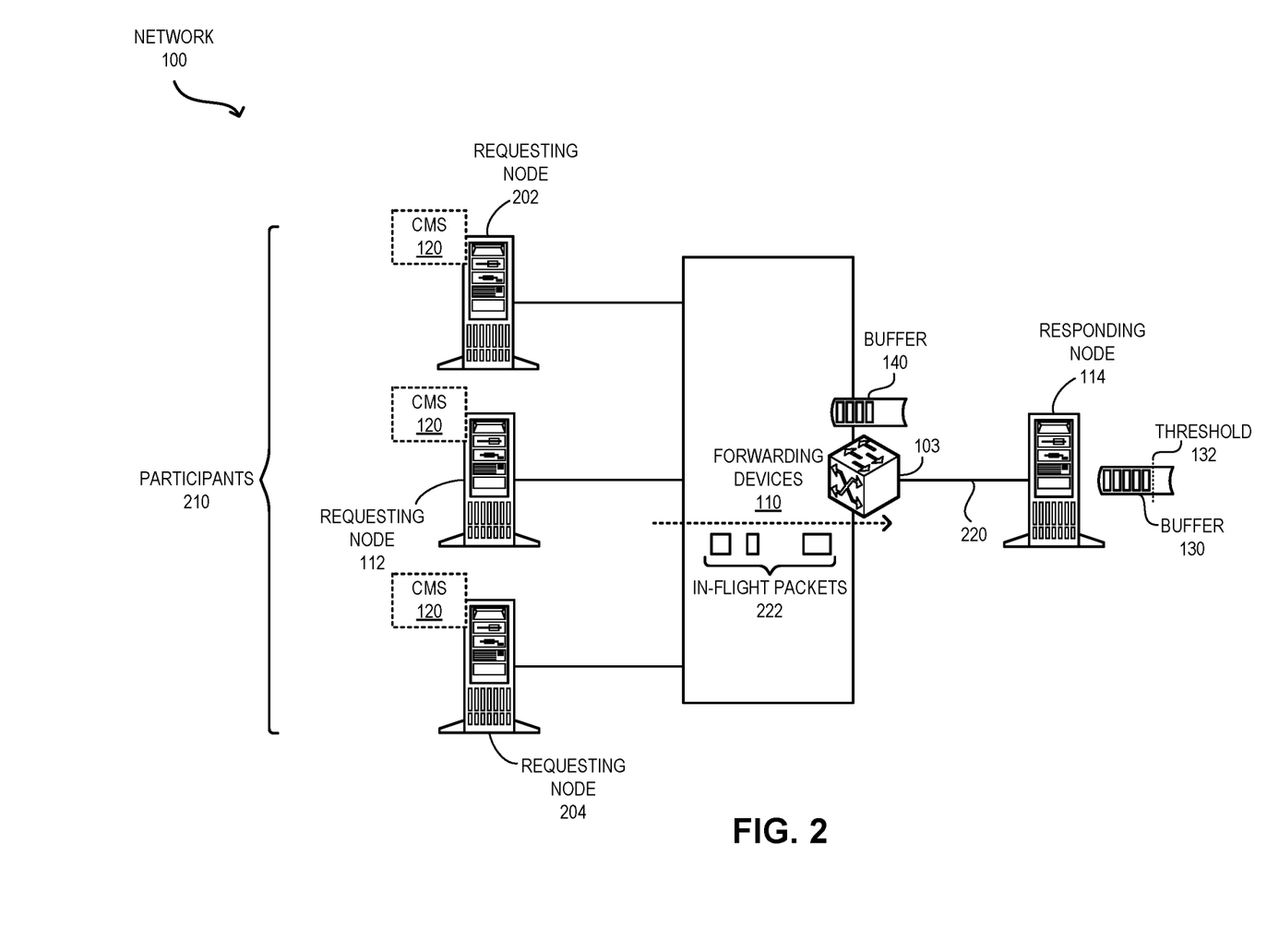
FIG. 2 illustrates exemplary parameters indicating buffer availability for quota-based congestion management, in accordance with an aspect of the present application.

FIG. 2 illustrates an exemplary parameters indicating buffer availability for quota-based congestion management, in accordance with an aspect of the present application. A number of requesting nodes 112, 202, and 204 can be in communication with responding node 114 via forwarding devices 110. Therefore, requesting nodes 112, 202, and 204 can be participants 210 in transactions with responding node 114. Each of these nodes may need a fraction of space in buffer 130 for sending packets to responding node 114. A respective requesting node may maintain and execute an instance of congestion management system 120. Hence, the operations directed to the quota-based congestion management facilitated by system 120 can be executed by a respective of requesting nodes 112, 202, and 204. In some examples, these operations are independently executed by individual instances of system 120 without obtaining feedback from another instance. The instances of congestion management system 120 can operate on the respective NICs of the requesting nodes and facilitate the quota-based congestion management for the corresponding requesting nodes.

During operation, system 120 on requesting node 112 can determine information indicating the expected performance of the components of network 100 based on the configuration parameters of the components. For example, system 120 can determine the link latency of link 220 based on the capacity of link 220. System 120 can also determine system-level parameters affecting queuing (e.g., size of buffer 140). Such information can be persistent for the components in network 100. System 120 on requesting node 112 can also maintain information associated with in-flight packets 222 from requesting node 112. System 120 can also maintain records of received response packets from responding node 114 (e.g., via switch 107). In some examples, system 120 can maintain the records of the response packets needed to determine a response rate from responding node 114. A respective requesting node of network 100 may maintain such information in a data structure or a database table. System 120 can use the information to determine the utilization of buffer 140.

System 120 may monitor one or more triggering events when requesting node 112 may determine the buffer utilization of switch 107. The triggering events can include one or more of: initiating a transaction request by an application on requesting node 112, injecting a packet into network 100 by requesting node 112, receiving a response from responding node 114 for an ongoing transaction, and detecting a packet drop. Upon detecting a triggering event, system 120 can update its determination of the utilization of buffer 140. Based on the utilization of buffer 140, system 120 on requesting node 112 can determine the fraction of buffer space available for packets from requesting node 112. When requesting node 112 needs to send a new packet into network 100 (e.g., an application on requesting node 112 attempts to inject the new packet), system 120 can determine whether the determined fraction of space on buffer 140 can accommodate the packet.

System 120 may determine the fraction of buffer 140 for packets from requesting node 112 as a function of the amount of data that requesting nodes 112, 202, and 204 may send to responding node 114. Since the expected time for traversing the switches of forwarding devices 110, system 120 can determine the nominal latency, nomLatency, between requesting node 112 and switch 107. If multiple requesting nodes share the same set of network components, their corresponding nomLatency can be the same. Consequently, nomLatency can be determined for a group of requesting nodes sharing network components or individual requesting nodes. Any additional time experienced by a packet from requesting node 112 above the nominal latency value can then indicate the delay caused by queuing of the packet in network 100.

Typically, such queuing may occur if the packet is not forwarded at the line rate (e.g., due to contention of resources in network 100). System 120 can then determine the queuing delay, queueDelay, as (packetDelay−nomLatency). Here, packetDelay is the delay experienced by the packet and can be determined as (respTime−injectionTime). Here, injectionTime and respTime can indicate the time of the packet injection and the arrival of the response of the packet at requesting node 112, respectively. To determine queueDelay, system 120 may consider exponentially distributed traffic that is not saturating network 100.

Upon determining queueDelay, system 120 can obtain the respective sizes of packets 222. Since packets 222 are sent from requesting node 112, system 120 on requesting node 112 can have access to the information indicating their respective sizes. In other words, the packet sizes can be known to system 120. Accordingly, system 120 can determine (e.g., infer or calculate) the average utilization, avgUtil, of buffer 140 as $$\frac{1}{\frac{avgBytes}{linkRate * queueDelay} + 1}$$

Here, avgBytes can indicate the average number of bytes per packet in packets 222, and linkRate can indicate the forwarding capacity of the least capacity link that packets 222 traversed. Furthermore, nomLatency can indicate the expected latency for an outstanding packet sent from requesting node 112 in network 100. The value of nomLatency can be determined as the injection time of the oldest packet for which requesting node 112 has not received a response.

Dividing the total size of buffer 140 by the number of participants 210 (e.g., requesting nodes 112, 202, and 204) can indicate the amount of buffer space available for each requesting node sending traffic to buffer 140. However, since each instance of system 120 may operate independently, system 120 may determine the number of participants 210, numParticipants, as $$\max\left(1, \frac{avgUtil * linkRate * respTime}{totalBytes}\right)$$

Here, totalBytes can indicate the total number of bytes in flight. For example, for the instance of system 120 on requesting node 112, totalBytes can be the total number of bytes of packets 122. System 120 can then determine a fraction of buffer space that may be used by the packets from requesting node 112, fracBuffSpace, as $$\frac{totBuffSize}{numParticipants}.$$

Here, totBuffSize can indicate the size of buffer 140.

System 120 can maintain a limited record of response times. Therefore, system 120 can maintain a rolling record of the response times over time. Using the record, system 120 can identify sustained and transient events in network 100. Based on the record, system 120 can ensure that the rate of injected packets from requesting node 112 matches the rate of received responses from responding node 114. System 120 can then determine a transient rate of participants, participantsRate, as $$\max\left(1, \frac{linkRate}{responseRate}\right)$$

Here, responseRate can be an average of the size of the recorded responses over the total time required to receive that data. If participantsRate is greater than the previously estimated number of participants, numParticipants, system 120 can update responseRate and recalculate the value of numParticipants. In this way, system 120 can smooth the spikes of responses, thereby mitigating the effect of transient events.

In some examples, each instance of system 120 can notify the other instances when a new transaction with responding node 114 is initiated and terminated. To do so, system 120 can send a broadcast message in network 100 or join a multicast group for the transaction to responding node 114 and send a multicast message. Consequently, each instance of system 120 may know when a participant has initiated or terminated a transaction to responding node 114. Based on the notification, system 120 may increment or decrement the value of numParticipants for the initiation and termination, respectively. In this way, system 120 may determine numParticipants based on the notifications and avoid the inference of a value of numParticipants.

Figure 3:
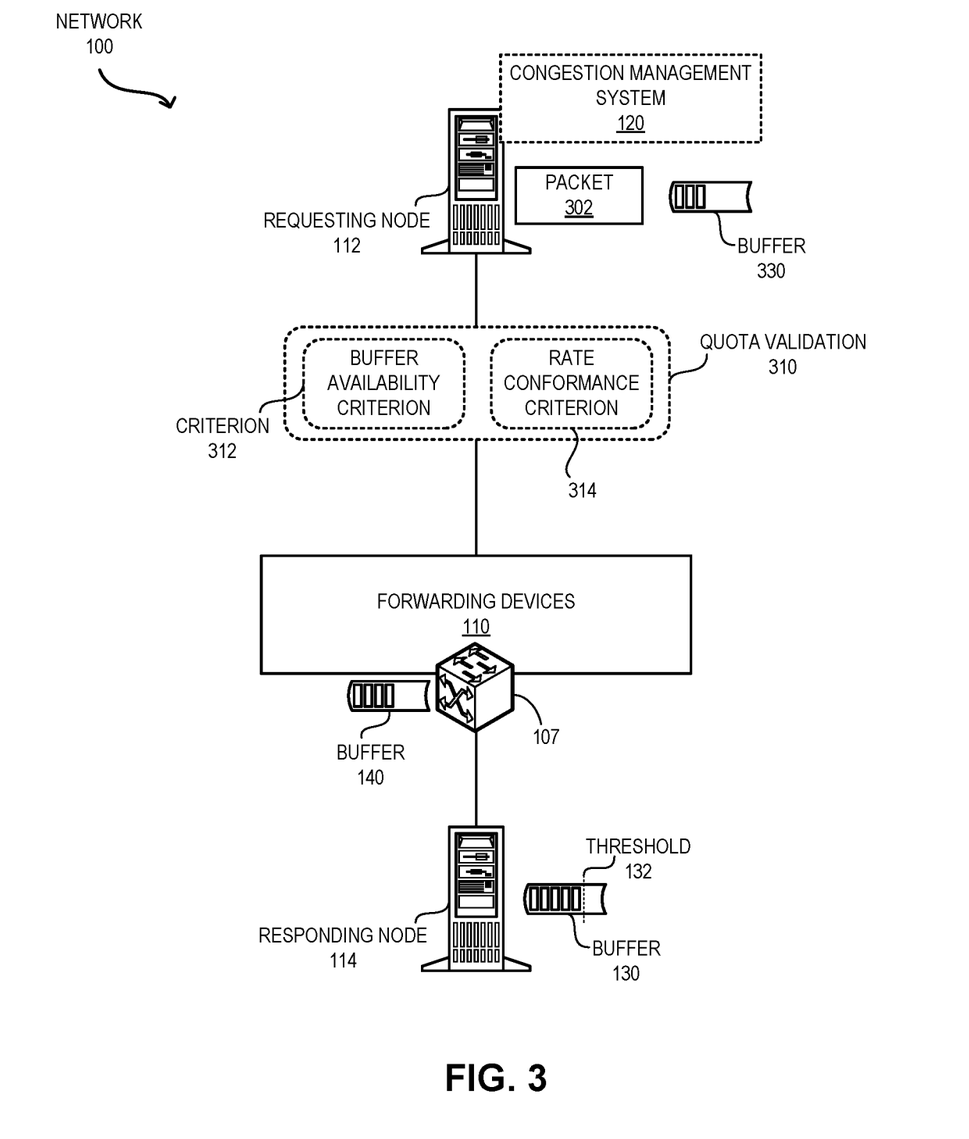
FIG. 3 illustrates an exemplary packet forwarding based on quota-based congestion management, in accordance with an aspect of the present application.

FIG. 3 illustrates an exemplary packet forwarding based on quota-based congestion management, in accordance with an aspect of the present application. If system 120 determines that a new packet 302 of a transaction may overwhelm buffer 140, requesting node 112 may initiate throttling traffic for responding node 114 and refrain from injecting packet 302 into network 100. System 120 may perform quota validation 310 for packet 302 to determine whether the injection of packet 302 conforms to the quota (e.g., the fraction of buffer space in buffer 140) allocated to requesting node 112. Quota validation 310 can include criteria 312 and 314. Requesting node 112 can throttle the injection of traffic to forwarding devices 110 if quota validation is unsuccessful (i.e., both criteria 312 and 314 are not satisfied).

Such throttling can be proportional to the number of participants (e.g., participants 210 in FIG. 2). If the requesting node 112 is sending all of its egress traffic to congested responding node 114, requesting node 112 can determine a high queuing delay and hence, may determine a large number of participants. On the other hand, when the egress traffic from requesting node 112 is distributed, the queuing delay determined by requesting node 112 can be relatively lower. As a result, requesting node 112 may have lower traffic throttling compared to the previous scenario. More generally, system 120 can throttle all traffic sent from requesting node 112 more heavily when more traffic is sent to congested responding node 114. In contrast, when the traffic flow is distributed (e.g., uniform random distribution), the average queuing delay can be lower. Under such circumstances, system 210 can inject at a higher rate because of more non-contributing traffic.

Criteria 312 can be directed to buffer availability and indicate whether the packet size of packet 302 is less than or equal to the fraction of buffer space for the packets from requesting node 112. To determine conformity to criteria 312, system 120 can determine $$pktSize \leq fracBuffSpace - totalBytes$$

Here, pktSize can indicate the size of a new packet, such as packet 302. Criteria 312 can indicate that even if buffer 140 stores all bytes of the in-flight packets, the fraction of space in buffer 140 associated with requesting node 112 can accommodate packet 302. Criteria 314 can be directed to rate conformance and indicate whether the rate of the responses from responding node 114 matches the injection rate of request packets from requesting node 112. To determine conformity to criteria 314, system 120 can determine $$currentTime \geq lastInjTime + \frac{totalBytes + pktSize}{responseRate}$$

Here, lastInjTime can indicate the time of the last injected packet. Criteria 314 can indicate whether the time taken to receive a response for all bytes of the in-flight packets and the bytes of the new packet is within the current time.

If quota validation 310 is successful (i.e., both criteria 312 and 314 are satisfied), system 120 can permit requesting node 112 to inject packet 302 into network 100. Otherwise, system 120 may store packet 302 in a local buffer 330 used for storing packets withheld by system 120. When both criteria 312 and 314 are satisfied, system 120 can obtain packet 302 and inject it into network 100. When a response, which may belong to a different transaction, is received from responding node 114, requesting node 112 may re-determine the fraction of available buffer space, fracBuffSpace, associated with requesting node 112. Since a response may free space in buffer 140, the re-determination may indicate the availability of adequate buffer space at responding node 114. In addition, if the rate of the responses from the responding node matches the rate of request packets, the requesting node may send packet 302 to the responding node. In this way, system 120 can throttle traffic without requiring an ECN-based response from responding node 114. Unlike an ECN-based response from responding node 114, where traffic to all responding nodes are throttled equally, system 120 can throttle traffic proportional to the amount of data sent to congested responding node 114, thereby facilitating efficient congestion management in network 100.

Figure 4A:
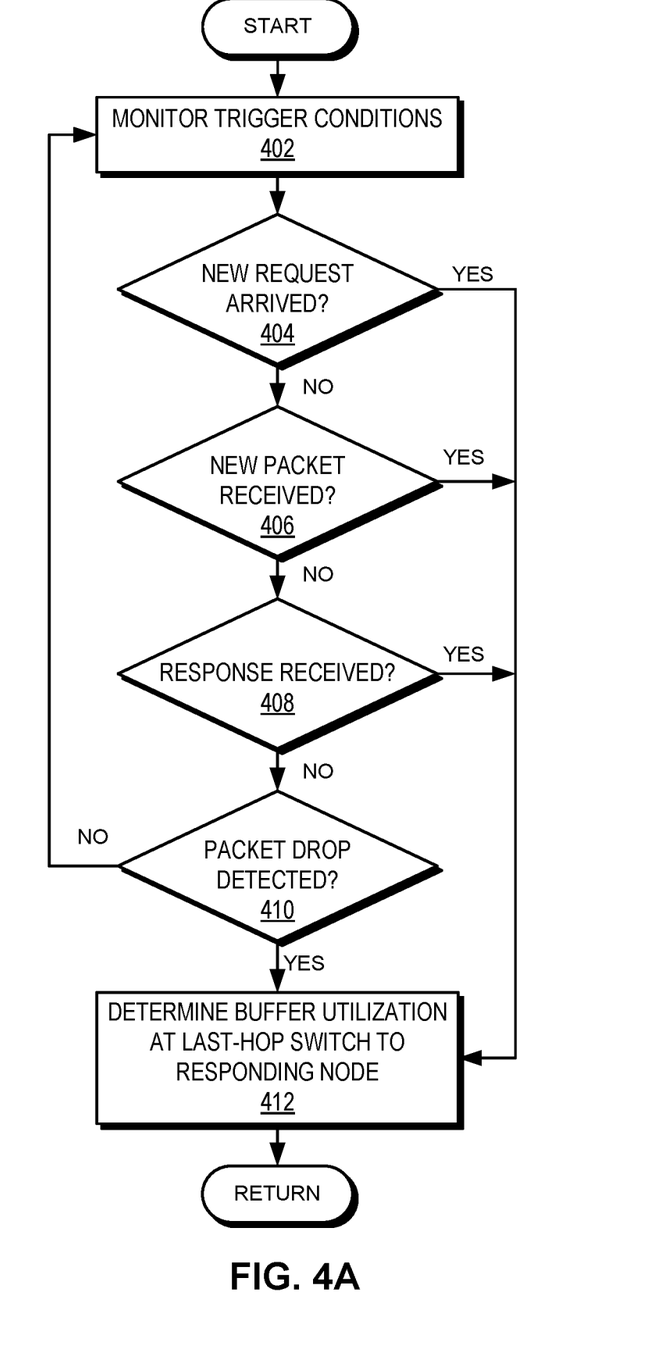
FIG. 4A presents a flowchart illustrating the process of a congestion management system determining whether to determine indicators associated with quota-based congestion management, in accordance with an aspect of the present application.

FIG. 4A presents a flowchart illustrating the process of a congestion management system determining whether to determine indicators associated with quota-based congestion management, in accordance with an aspect of the present application. During operation, the system can monitor one or more trigger conditions (operation 402). The system can determine whether a new request has arrived (operation 404). If no new request has arrived, the system can also check whether a new packet is received (operation 406). If no new packet is received, the system can check whether a response is received (operation 408). If no response is received, the system can also check whether a packet drop is detected (operation 410).

If not packet drop is not detected, the system can continue to monitor the trigger conditions (operation 402). It should be noted that the system can perform operations 404, 406, 408, and 410 in parallel or a different sequence. These operations are not dependent on each other. However, if a request arrives (operation 404), a packet is received (operation 406), a response is received (operation 408), or a packet drop is detected (e.g., based on an expired timer) (operation 410), the system can detect that at least one trigger condition has been satisfied. Consequently, the system can determine the buffer utilization at the last-hop switch to a responding node (operation 412).

Figure 4B:
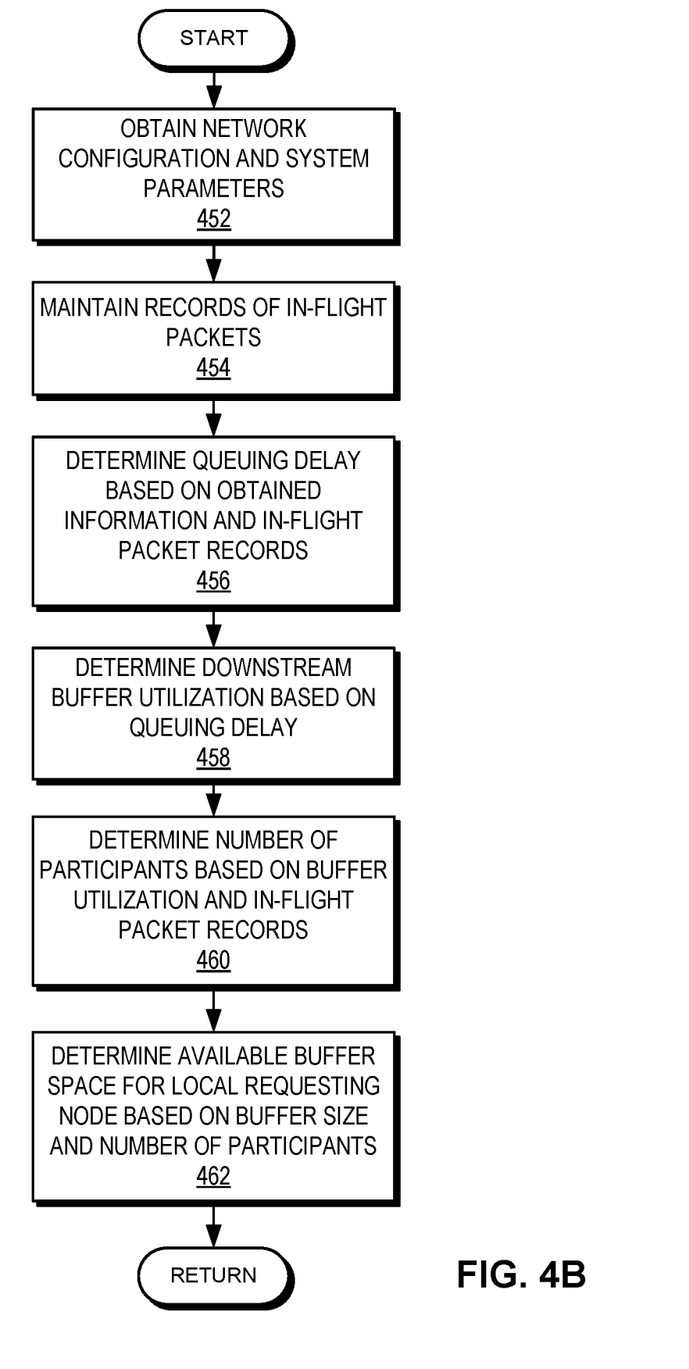
FIG. 4B presents a flowchart illustrating the process of a congestion management system determining buffer availability for quota-based congestion management, in accordance with an aspect of the present application.

FIG. 4B presents a flowchart illustrating the process of a congestion management system determining buffer availability for quota-based congestion management, in accordance with an aspect of the present application. During operation, the system can obtain the network configuration and system parameters (operation 452). The system can also maintain records of in-flight packets (operation 454). The system can then determine the queuing delay based on the obtained information and the in-flight packet records (operation 456). Subsequently, the system can determine the downstream buffer utilization (e.g., at the last-hop switch to a responding node) based on the queuing delay (operation 458). The system can also determine the number of participants based on the buffer utilization and the in-flight packet records (operation 460). The system can then determine the available buffer space for the local requesting node based on the available buffer space and number of participants (operation 462).

Figure 5A:
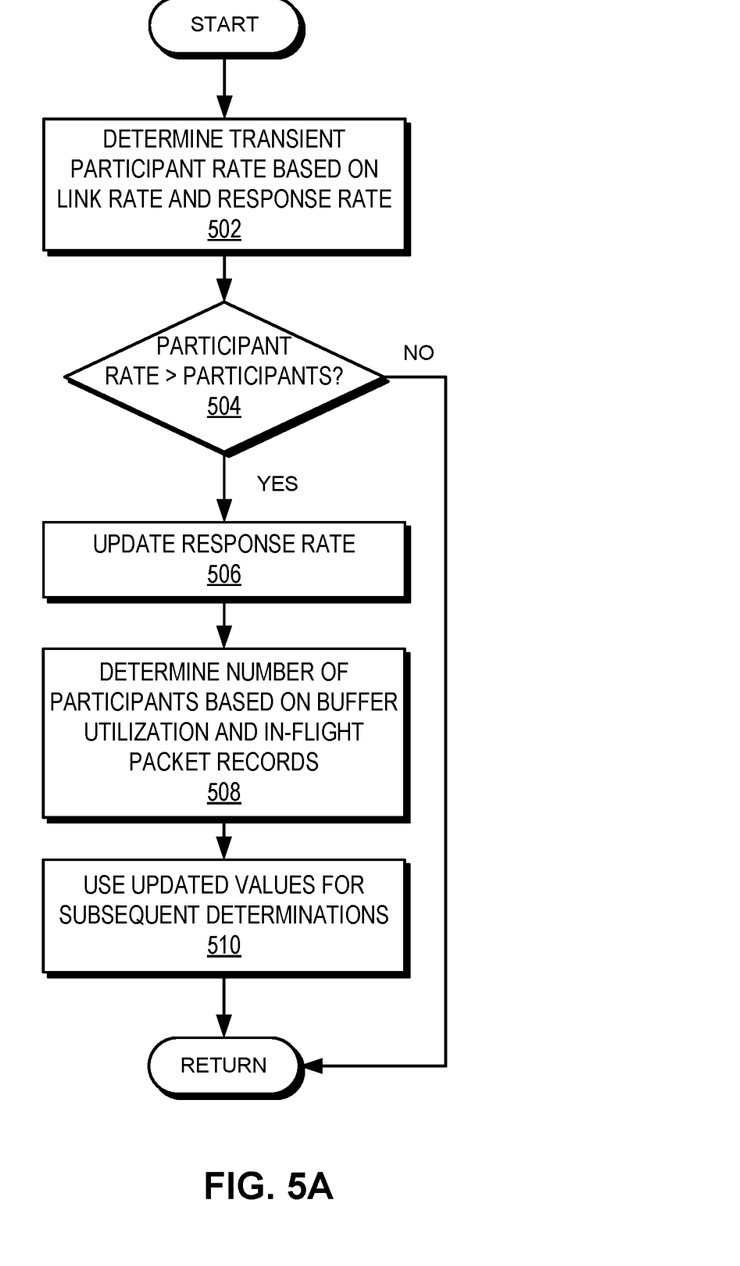
FIG. 5A presents a flowchart illustrating the process of a congestion management system determining participants for quota-based congestion management, in accordance with an aspect of the present application.

FIG. 5A presents a flowchart illustrating the process of a congestion management system determining participants for quota-based congestion management, in accordance with an aspect of the present application. During operation, the system can determine the transient participant rate based on the link rate and the response rate (operation 502). The system can then determine whether the participant rate is greater than the number of participants determined by the system (operation 504). If the participant rate is greater than the number of participants, the system can update the response rate (operation 506), determine the number of participants based on the buffer utilization and the in-flight packet records (operation 508), and use the updated values for subsequent determinations (operation 510).

Figure 5B:
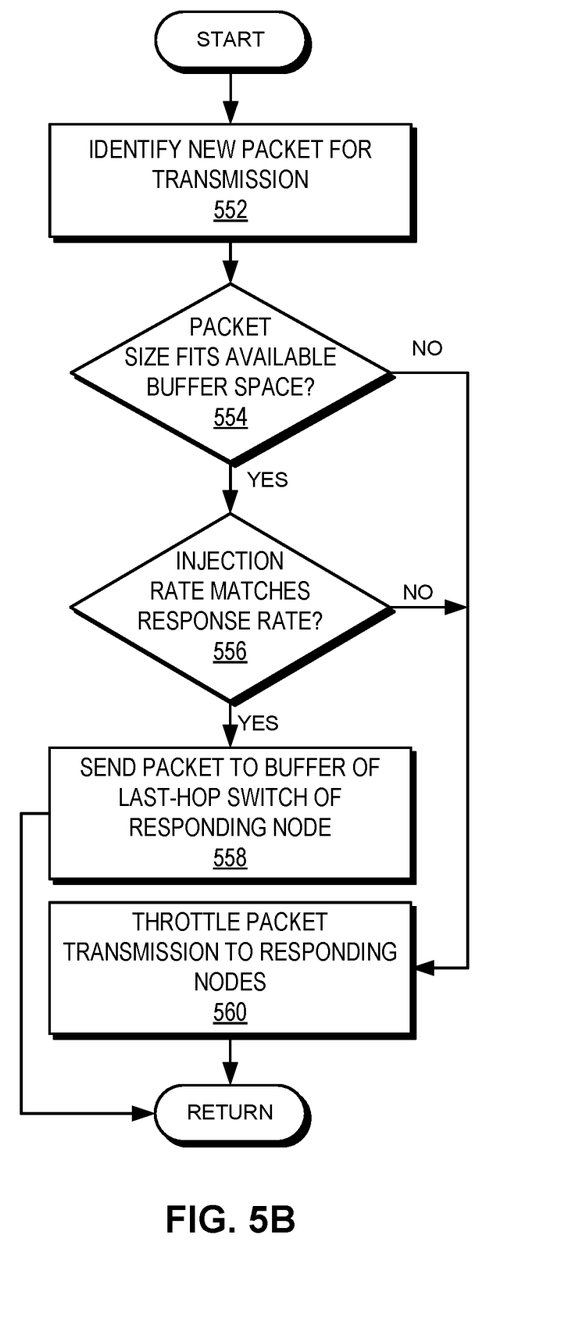
FIG. 5B presents a flowchart illustrating the process of a congestion management system forwarding a packet based on quota-based congestion management, in accordance with an aspect of the present application.

FIG. 5B presents a flowchart illustrating the process of a congestion management system forwarding a packet based on quota-based congestion management, in accordance with an aspect of the present application. During operation, the system can identify a new packet for transmission (operation 552) and determine whether the packet size fits into the available buffer space (operation 554). The available buffer space can be on the last-hop switch to the responding node. If the packet fits, the system can determine whether the injection rate of requesting packets matches the response rate (operation 556). If the injection rate matches, the packet has conformed to the quota validation. The system can then send the packet to a buffer of the last-hop switch of the responding node (operation 558). If the packet size does not fit into the available buffer space (operation 554) or the injection rate of requesting packets does not match the response rate (operation 556), the system can throttle packet transmission to the responding nodes (operation 560).

Figure 6:
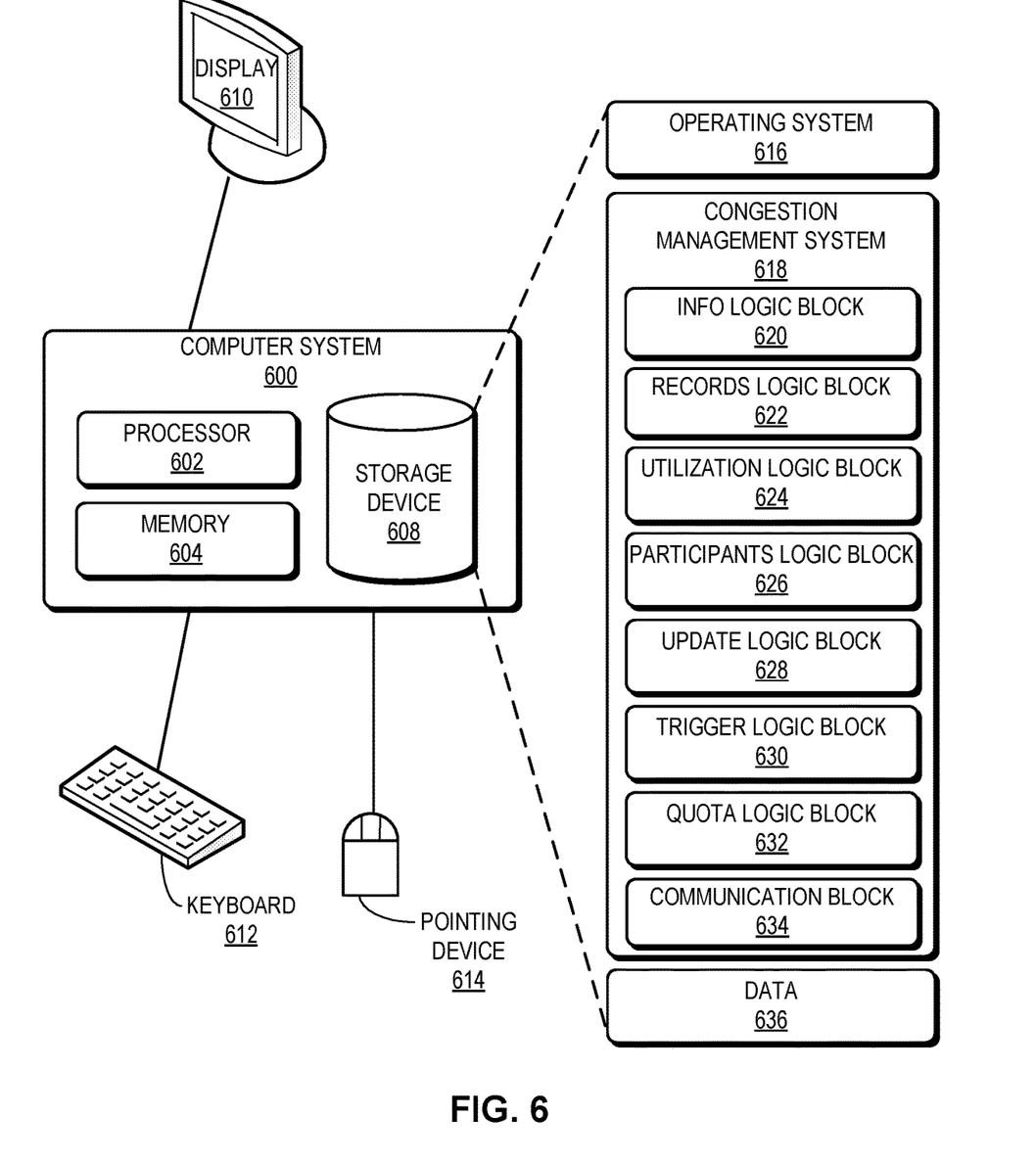
FIG. 6 illustrates an exemplary computer system that facilitates dynamic quota-based congestion management, in accordance with an aspect of the present application.

FIG. 6 illustrates an exemplary computer system that facilitates dynamic quota-based congestion management, in accordance with an aspect of the present application. Computer and communication system 600 includes a processor 602, a memory device 604, and a storage device 608. Memory device 604 can include a volatile memory device (e.g., a dual in-line memory module (DIMM)). Furthermore, computer and communication system 600 can be coupled to a display device 610, a keyboard 612, and a pointing device 614. Storage device 608 can store an operating system 616, a congestion management system 618, and data 636. Congestion management system 618 can facilitate the operations of system 110.

Congestion management system 618 can include instructions, which when executed by computer and communication system 600 can cause computer and communication system 600 to perform methods and/or processes described in this disclosure. Specifically, congestion management system 618 can include instructions for obtaining configuration parameters of the network components, and system-level parameters affecting queuing (information logic block 620). Furthermore, congestion management system 618 can include instructions for maintaining records of in-flight packets to a responding node (records logic block 622).

Congestion management system 618 can also include instructions for determining the utilization of a downstream buffer (e.g., at the last-hop switch to a responding node) (utilization logic block 624).

Moreover, congestion management system 618 can include instructions for determining the number of participants associated with a responding node (participants block 626). Furthermore, congestion management system 618 can include instructions for updating the number of participants, if needed (update logic block 628). Congestion management system 618 can also include instructions for monitoring the trigger conditions (trigger logic block 630). Congestion management system 618 can then include instructions for triggering the determination of buffer utilization and participants (trigger logic block 630). Such triggering can include obtaining the information needed for determining the utilization and participants.

Congestion management system 618 can include instructions for determining whether a new packet conforms to the quota validation (quota logic block 632). In addition, congestion management system 618 may include instructions for injecting the new packet into a network upon successful validation (quota logic block 632). Congestion management system 618 can also include instructions for buffering the new packet upon unsuccessful validation (quota logic block 632). Congestion management system 618 may further include instructions for sending and receiving messages, such as request/response packets (communication logic block 634).

Data 636 can include any data that can facilitate the operations of congestion management system 618. Data 636 can include, but are not limited to, information associated with in-flight packets, configuration parameters of the network components, and system-level parameters affecting queuing.

Figure 7:
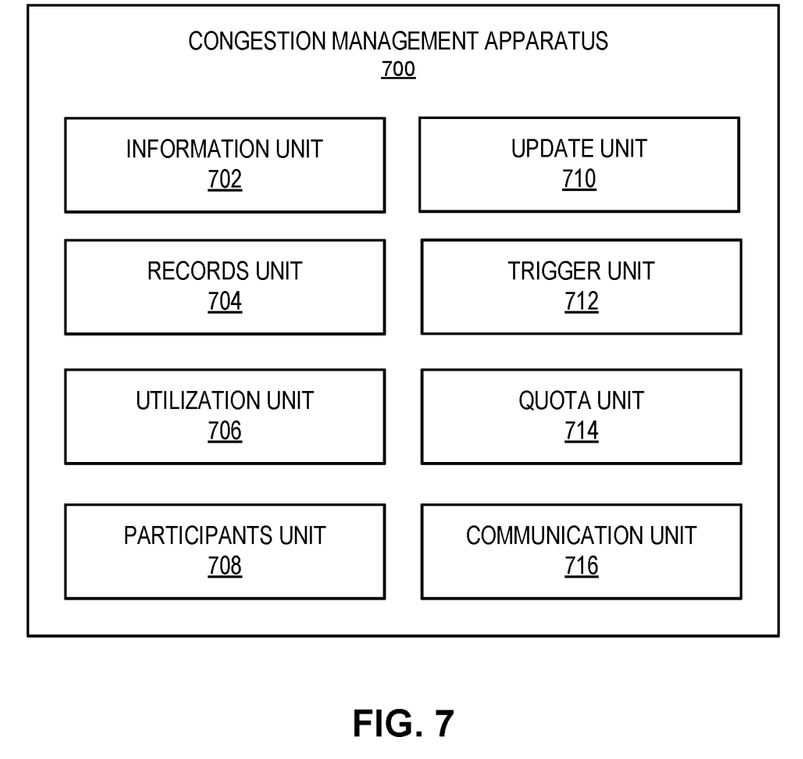
FIG. 7 illustrates an exemplary apparatus that facilitates dynamic quota-based congestion management, in accordance with an aspect of the present application.

FIG. 7 illustrates an exemplary apparatus that facilitates dynamic quota-based congestion management, in accordance with an aspect of the present application. Congestion management apparatus 700 can comprise a plurality of units or apparatuses which may communicate with one another via a wired, wireless, quantum light, or electrical communication channel. Apparatus 700 can be a switch in a network. Apparatus 700 may be realized using one or more integrated circuits, and may include fewer or more units or apparatuses than those shown in FIG. 7. Further, apparatus 700 may be integrated into a computer system, or realized as a separate device that is capable of communicating with other computer systems and/or devices. Specifically, apparatus 700 can comprise units 702-716, which perform functions or operations similar to modules 620-634 of computer and communication system 600 of FIG. 6, including: an information unit 702; a records unit 704; a utilization unit 706; a participants unit 708; an update unit 710; a trigger unit 712; a quota unit 714; and a communication unit 716.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating sender-side congestion control, the method comprising:
   determining, by a sender node, utilization of a buffer at a last-hop switch to a receiver node based on in-flight packets to the receiver node, wherein the receiver node is reachable from the sender node via the last-hop switch, and wherein the buffer stores packets destined to the receiver node from one or more nodes;
   determining, by the sender node, a fraction of available space in the buffer for packets from the sender node based on the utilization of the buffer;
   determining, by the sender node, whether the fraction of the available space in the buffer can accommodate a next packet from the sender node while avoiding congestion at the buffer; and
   in response to determining that the fraction of the available space in the buffer can accommodate the next packet, allowing the sender node to send the next packet to the receiver node by:
      determining a request rate from the sender node to the receiver node based on a combination of previous packets to the receiver node and the next packet; and
      determining whether the request rate is within a response rate from the receiver node.

2. The method of claim 1, further comprising determining a number of the one or more nodes sending packets to the receiver node based on the utilization of the buffer and the in-flight packets to the receiver node.

3. The method of claim 2, further comprising determining the fraction of the available space based further on the number of the one or more nodes.

4. The method of claim 2, further comprising updating the number of the one or more nodes based on a response rate from the receiver node.

5. The method of claim 1, wherein determining the utilization of the buffer further comprises determining a steady-state utilization of the buffer based on a queuing delay between the sender and receiver nodes.

6. The method of claim 5, further wherein determining the steady-state utilization of the buffer is further based on a bytes average per packet of the packets and a link rate of a least capacity link.

7. The method of claim 1, further comprising, in response to determining that sending the next packet can cause congestion at the buffer, buffering the next packet at the sender node, thereby avoiding triggering congestion control.

8. The method of claim 1, wherein determining the utilization of the buffer further comprises:
monitoring a set of triggering events at the sender node; and
in response to detecting at least one triggering event, determining information associated with the utilization of the buffer.

9. The method of claim 8, wherein the set of triggering events comprises one or more of:
initiating a transaction request by an application on the sender node;
injecting a packet by the sender node;
receiving a response from the receiver node; and
detecting a packet drop.

10. The method of claim 1, further comprising sending, by the sender node to a rest of the one or more nodes, a notification indicating the sending of the next packet.

11. A computer system, comprising:
a processor;
a non-transitory computer-readable storage medium storing instructions, which when executed by the processor causes the processor to perform a method for facilitating sender-side congestion control, the method comprising:
determining utilization of a buffer at a last-hop switch to a remote computer system based on in-flight packets to the remote computer system, wherein the remote computer system is reachable from the computer system via the last-hop switch, and wherein the buffer stores packets destined to the remote computer system from one or more computer systems;
determining a fraction of available space in the buffer for packets from the computer system based on the utilization of the buffer;
determining whether the fraction of the available space in the buffer can accommodate a next packet from the computer system while avoiding congestion at the buffer; and
in response to determining that the fraction of the available space in the buffer can accommodate the next packet, allowing the computer system to send the next packet to the remote computer system by:
determining a request rate from the computer system to the remote computer system based on a combination of previous packets to the remote computer system and the next packet; and
determining whether the request rate is within a response rate from the remote computer system.

12. The computer system of claim 11, wherein the method further comprises determining a number of the one or more computer systems sending packets to the remote computer system based on the utilization of the buffer and the in-flight packets to the remote computer system.

13. The computer system of claim 12, wherein the method further comprises determining the fraction of the available space based further on the number of the one or more computer systems.

14. The computer system of claim 12, wherein the method further comprises updating the number of the one or more computer systems based on a response rate from the remote computer system.

15. The computer system of claim 11, wherein determining the utilization of the buffer further comprises determining a steady-state utilization of the buffer based on a queuing delay between the computer system and the remote computer system.

16. The computer system of claim 15, wherein determining the steady-state utilization of the buffer is further based on a bytes average per packet of the packets and a link rate of a least capacity link.

17. The computer system of claim 11, wherein the method further comprises, in response to determining that sending the next packet can cause congestion at the buffer, buffering the next packet at the sender node, thereby avoiding triggering congestion control.

18. The computer system of claim 11, wherein determining the utilization of the buffer further comprises:
monitoring a set of triggering events at the computer system; and
in response to detecting at least one triggering event, determining information associated with the utilization of the buffer.

19. The computer system of claim 18, wherein the set of triggering events comprises one or more of:
initiating a transaction request by an application on the computer system;
injecting a packet by the computer system;
receiving a response from the remote computer system; and
detecting a packet drop.

20. The computer system of claim 11, wherein the method further comprises sending, from the computer system to a rest of the one or more computer systems, a notification indicating the sending of the next packet.

* * * * *